April 28, 1942. W. A. KUEHL 2,281,162
SOLDERING IRON CLEANING AND SUPPORTING STAND
Filed Nov. 13, 1939
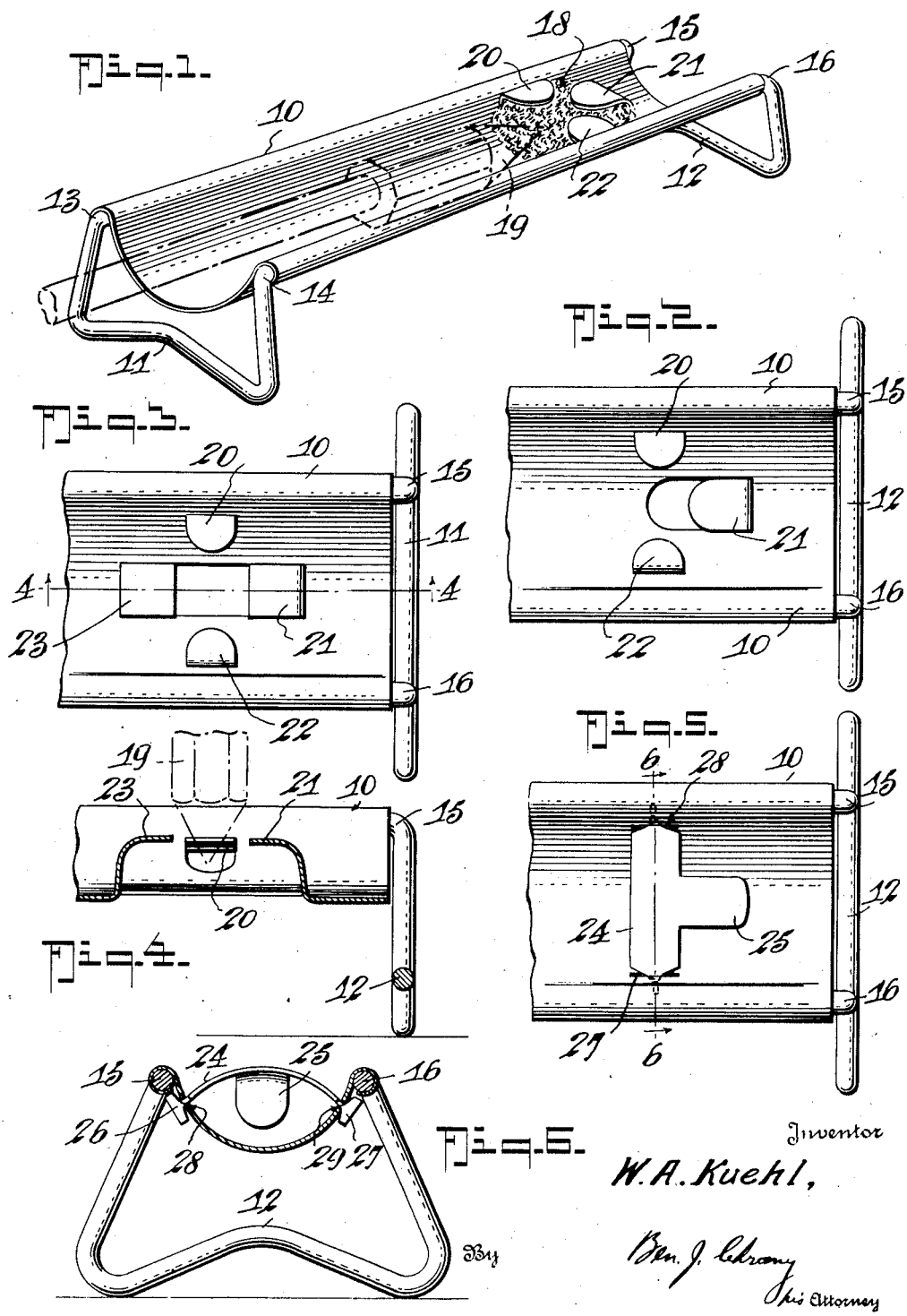
Inventor
W. A. Kuehl, Patented Apr. 28, 1942

2,281,162

UNITED STATES PATENT OFFICE 2,281,162

SOLDERING IRON CLEANING AND SUPPORTING STAND

Walter A. Kuehl, Chicago, Ill.

Application November 13, 1939, Serial No. 304,244

6 Claims. (Cl. 113—111)

This invention relates to soldering iron stands or holders in general. More particularly this invention relates to soldering iron stands or holders which are provided with means for cleaning the tip of the soldering iron.

An object of this invention is to provide a soldering iron stand upon which the soldering iron may be placed when not in use, said stand having attached thereto a cleaning or abrading element or elements which may be used for cleaning the tip of the soldering iron so that said tip will be in condition to be tinned prior to the soldering operation.

Another object of this invention is to provide a soldering iron stand or support of metallic or similar material, said stand or support having a bed upon which the soldering iron may be positioned and from which clasp-like elements project for receiving cleaning or abrading material for cleaning the soldering iron tip.

A further object of this invention is to provide a soldering iron stand or support having a bed for receiving a soldering iron, said bed having a plurality of clamping elements formed from portions thereof for receiving and holding a small wad of cleaning or abrading material like steel wool, for example, conveniently, so that the soldering iron tip may be easily cleaned by rubbing or rotating it in said steel wool wad.

Still a further object of this invention is to provide a soldering iron stand or support having a bed for receiving a soldering iron, said bed having provided thereover a member arched across a portion thereof for the purpose of holding abrading or cleaning material clamped down upon said bed so that the tip of said soldering iron may be cleaned by applying it to or rubbing or rotating it in said abrading or cleaning material either while the iron is hot or cold.

Other and further objects of this invention will be apparent to those skilled in the art to which it relates from the following specification and claims.

In accordance with this invention I provide a soldering iron holder or stand upon which the working element of the soldering iron may be placed or laid either in the hot or cold condition when it is not in actual use. It is well known that when the tip of a soldering iron is repeatedly heated that it becomes coated with an oxide scale or other dirt detrimental to the use of the iron for the purposes for which it was intended. This oxide scale must first be removed before the soldering iron tip may be properly tinned with solder and for this purpose I have provided a plurality of finger-like resilient clamping members cut out of the bottom of the soldering iron bed or attached thereto by suitable rivets, by spot welding, or otherwise, for the purpose of receiving a small wad of abrading material such as steel wool. This abrading material is held by the aforesaid finger-like resilient clamping members snugly against rotation so that the tip of the soldering iron may be forced into or against the steel wool wad and rotated therein or rubbed thereon under sufficient pressure to remove the oxide or other coating from said tip. It is of course obvious that materials other than steel wool, for example, copper wool impregnated with fluxes such as resin or salammoniac, may be used. Where desired the steel wool may also be impregnated with a suitable flux such as the aforesaid fluxes.

Further details of this invention are set forth in the following specification and the drawing in which, briefly, Fig. 1 is a perspective view of a soldering iron stand made in accordance with this invention; Fig. 2 is a fragmentary view of the top of the stand; Fig. 3 is a fragmentary view of a slightly modified form of this invention; Fig. 4 is a sectional view along the line 4—4 of Fig. 3; Fig. 5 is a fragmentary top view of another form of this invention; and Fig. 6 is a sectional view along the line 6—6 of Fig. 5.

Referring to the drawing in detail, reference numeral 10 designates the bed of the soldering iron stand, said bed being supported by the bent wire members 11 and 12 which are provided with end portions 13—14 and 15—16 respectively extending into the end openings of the rolled or tubular longitudinal edges of the bed 10. Three finger-like elements 20, 21 and 22 are cut out of the bottom of the bed 10 by a suitable cutting die and bent up into the hollow of the bed 10 to receive the steel wool wad 18 and hold this wad by a clamping action against the surface of the bed. These finger-like elements are preferably bent to form a partially enclosed pocket-like receptacle for the steel wool wad in which said wad may be securely held and yet be easily accessible to the soldering iron for cleaning.

It is of course obvious that the elements 20, 21 and 22 may be formed out of material other than portions of the bed 10 and that they may be riveted, spot welded or otherwise attached to said bed, if desired.

As shown, the finger-like elements are preferably located relatively near one end of bed 10 with the open side of the enclosure which they form facing toward the other end of bed 10, so that when substantially the entire length of the soldering iron is lying on bed 10 rotatable about its axis and positioned parallel to bed 10, its tip may be pushed into wad 18 and rotated therein.

In Fig. 1 the soldering iron 19 is illustrated in broken lines for the purpose of showing the relative position of the soldering iron tip with respect to the steel wool wad as the soldering iron tip is being cleaned. Of course the iron may be held in various other positions necessary, desirable or convenient for cleaning. When the soldering iron is not being used it is placed upon the bed 10 with the tip out of contact with the steel wool, care being taken not to leave the hot iron lying on the steel wool pad in contact therewith over extended periods of time since to do so would obviously accelerate the oxidation of the steel wool causing it to deteriorate rapidly.

In Figs. 3 and 4 I have illustrated another form of this invention in which a fourth finger-like element 23 is cut from the bottom of the bed 10 facing the element 21. In this form the tongues or finger-like elements are preferably formed to project well upward to provide a relatively open mouth partial enclosure so that the soldering iron may be pressed into the steel wool, held in this enclosure, through said mouth in the top of said enclosure as illustrated in the dotted outline of the iron 19 in Fig. 4. The steel wool is not illustrated in this view but is placed in between the fingers, in practice.

It is of course obvious that the fingers 20, 21, 22 and 23 may be made of various shapes and relative dimensions to suit different types of soldering irons.

Another embodiment of this invention is shown in Figs. 5 and 6 in which a strap-like element 24 is attached to the sides of the bed 10 and is arched over the hollow thereof so that the steel wool wad is held underneath this strap against said bed. A downwardly projecting member 25 is attached to the strap 24 for the purpose of holding the steel wool wad under said strap when the soldering iron tip is pressed and rotated in said wad for cleaning.

The sides of the end portions 26 and 27 of the strap 24 are notched and narrowed to be received in suitable slots 28 and 29 cut into the sides of the bed. These ends are twisted to draw surfaces of the strap and edges of the corresponding slots into firm engagement so that the strap is held in place.

Instead of cutting the slots 28 and 29 into bed 10 the ends 26 and 27 may be spot welded to said bed or suitable holes may be cut into said bed and strap and rivets employed for attaching said strap to said bed. Likewise the strap 24 and member 25 may be punched or cut out of the hollow or bottom of the bed 10 by a suitable die similar to the way in which the fingers 20, 21 and 22 are cut from said bed.

Where desired the steel wool may be impregnated with a flux material, such as, rosin, salammoniac and the like. However if an excessive amount of such material is used it may cake up in the steel wool and make it difficult to remove the steel wool from the holder shown in Figs. 3 and 4 when replacement thereof is desired, without the application of heat thereto. However this difficulty would not be encountered in the other forms of the invention.

It will be apparent that various modifications of this invention may be made without departing from the spirit and scope thereof and therefore I do not desire to limit this invention to the details of construction illustrated and described but claim it broadly as set forth in the claims.

What I claim is:

1. A soldering iron accessory comprising a trough-like bed, supporting members attached to said trough-like bed for supporting it in a substantially horizontal position, a plurality of resilient finger-like elements supported from the bottom of said bed and forming a partial enclosure, two of said elements being arranged to form opposite sides of said partial enclosure and the third of said elements being arranged to form the back thereof, and a cleaning and abrading element comprising metallic wool peripherally retained within said resilient finger-like elements, said cleaning and abrading element being formed in the shape of a wad having portions thereof extending into the spaces between said finger-like elements for holding said wad and being sufficiently exposed to permit the soldering iron tip to be forced against said wad and rotated without engaging said finger-like elements.

2. A soldering iron accessory according to claim 1, said resilient finger-like elements enclosing said wad being positioned relatively near one end of said bed and arranged with the open side of said enclosure facing toward the other end of said bed for receiving the tip of the soldering iron when the same is lying flat with substantially its full length supported at rest in said bed in position for rotation about the axis thereof parallel to said bed.

3. A soldering iron accessory comprising a trough-like bed, supporting members attached to said trough-like bed for supporting it in a substantially horizontal position, a plurality of resilient finger-like elements struck up from the bottom of said bed and forming a partial enclosure, two of said elements being arranged to form opposite sides of said partial enclosure and the third of said elements being arranged to form the back thereof, and a cleaning and abrading element comprising metallic wool positioned between said resilient finger-like elements, said cleaning and abrading element being formed in the shape of a wad having portions thereof extending into the spaces between said finger-like elements for holding said wad and being sufficiently exposed to permit the soldering iron tip to be forced against said wad and rotated without engaging said finger-like elements.

4. A soldering iron accessory according to claim 3, said resilient finger-like elements enclosing said wad being positioned relatively near one end of said bed and arranged with the open side of said enclosure facing toward the other end of said bed for receiving the tip of the soldering iron when the same is lying flat with substantially its full length supported at rest in said bed in position for rotation about the axis thereof parallel to said bed.

5. A soldering iron accessory comprising a trough-like bed, supporting members attached to said trough-like bed for supporting it in a substantially horizontal position, a plurality of flat tape-like members supported from the bottom of said bed and comprising enclosing elements which form a partial enclosure, two of said elements being arranged to form opposite sides of said partial enclosure and the third of said elements being arranged to form the back thereof, said elements extending substantially diametrically from a central point of said enclosure, and a cleaning and abrading element comprising metallic wool positioned between said elements, said cleaning and abrading element being formed in the shape of a wad having portions thereof extending into the spaces between said elements for holding said wad and being sufficiently exposed to permit the soldering iron tip to be forced laterally through the open front of said enclosure against said wad and rotated without engaging said elements.

6. A soldering iron accessory according to claim 5, said elements enclosing said wad being positioned relatively near one end of said bed and arranged with the open side of said enclosure facing toward the other end of said bed for receiving the tip of the soldering iron when the same is lying flat with substantially its full length supported at rest in said bed in position for rotation about the axis thereof parallel to said bed.

WALTER A. KUEHL.